United States Patent [19]

Wright

[11] 4,194,429

[45] Mar. 25, 1980

[54] QUICK RELEASE FASTENERS

[75] Inventor: Andrew C. W. Wright, Farnham, England

[73] Assignee: Dzus Fastener Co., Inc., West Islip, N.Y.

[21] Appl. No.: 904,010

[22] Filed: May 8, 1978

[51] Int. Cl.² .............................................. F16B 21/02
[52] U.S. Cl. ................................... 85/5 P; 24/221 R
[58] Field of Search .......... 85/5 P; 24/221 R, 221 A, 24/221 K, 221 RC; 292/DIG. 11

[56] References Cited

U.S. PATENT DOCUMENTS

| 2,421,204 | 5/1947 | Jung ..................... 24/221 A |
| 3,123,389 | 3/1964 | Biesecker ................ 24/221 L X |
| 3,854,173 | 12/1974 | Barnett ................... 24/221 K X |

FOREIGN PATENT DOCUMENTS

| 862190 | 2/1941 | France ..................... 24/221 R |
| 2286966 | 4/1976 | France ........................ 85/5 P |
| 588886 | 6/1947 | United Kingdom ................ 24/221 R |
| 829128 | 2/1960 | United Kingdom ................ 24/221 R |
| 1154684 | 6/1969 | United Kingdom ..................... 85/5 P |
| 1256295 | 12/1971 | United Kingdom ................ 24/221 R |

Primary Examiner—Rodney H. Bonck
Attorney, Agent, or Firm—Kane, Dalsimer, Kane, Sullivan & Kurucz

[57] ABSTRACT

The invention relates to a quarter-turn fastener comprising a plastics stud and a spacer, the stud having a head and shank. The shank has, at its end remote from the head, a cross-head and includes an abutment arranged to engage the side of an aperture through which the stud is mounted in use, on rotation of the stud through a quarter of a turn, to prevent further rotation in the same sense. The spacer is resilient and defines an aperture through which the shank of the stud passes in use, said spacer including a distance piece for preventing two members to be fastened together by said fastener, one situated on either side of the spacer, from coming into contact with one another adjacent said spacer.

5 Claims, 4 Drawing Figures

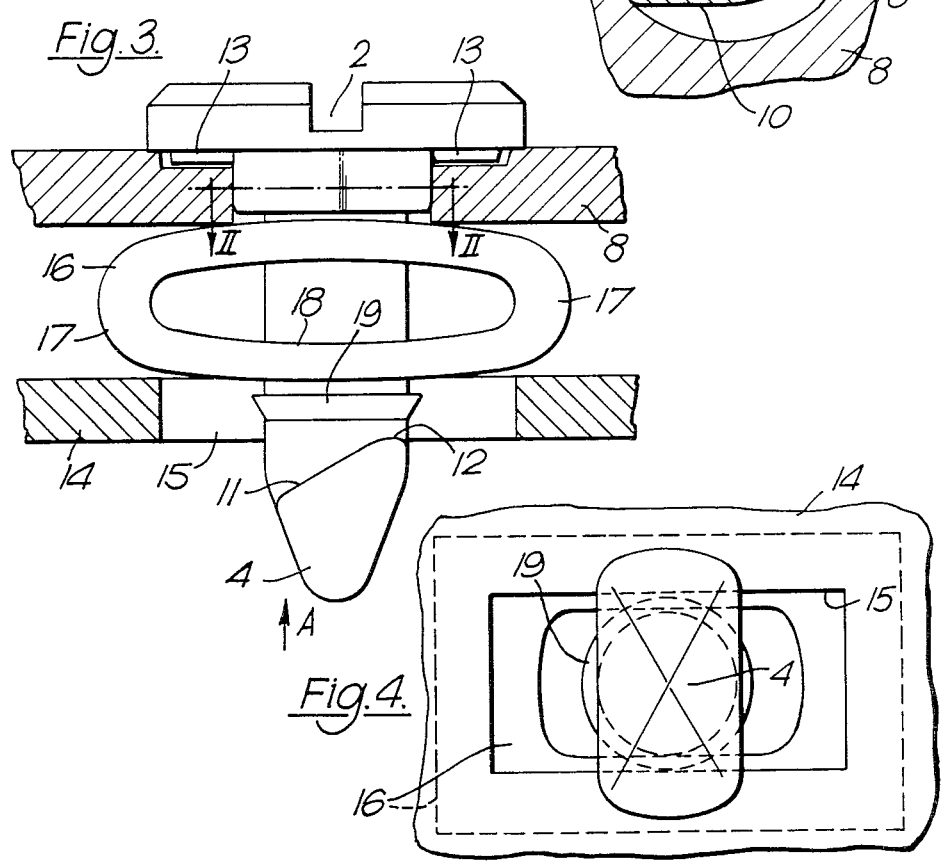

QUICK RELEASE FASTENERS

The present invention relates to so-called quarter-turn fasteners for fastening together for example a panel to a support through a pair of aligned slots.

Numerous such fasteners have been proposed, but many of them suffer from the disadvantage that they comprise a multiplicity of parts which therefore increases the cost of the fastener. Additionally, in certain applications it is required that the panel does not abut its support, but is spaced by a small distance from the support. This is particularly required on domestic electrical equipment such as televisions etc. where the chassis of the television might, in the event of a fault be at a very high voltage making it essential that the removable rear panel of the television should be insulated from the chassis and therefore spaced apart from it.

According to the present invention a quarter-turn fastener comprises a plastics stud and a spacer, the stud having a head and shank having at its end remote from the head a cross-head, and including an abutment arranged to engage the side of an aperture through which the stud is mounted in use on rotation of the stud through a quarter of a turn to prevent further rotation in the same sense, the spacer being resilient and having an aperture through which the shank of the stud passes in use and including a distance piece for preventing two members to be fastened together by the fastener, one situated on either side of the spacer, from coming into contact with one another adjacent the spacer.

Normally, such a fastener will be used to fasten a panel to a support, the fastener passing through elongate apertures in both the panel and the support. Adjacent the head of the stud the shank may have a lozenge-shaped cross-section formed by arcuate segments concentric with the axis of the stud and right-angled abutment parts extending from the ends of the arcuate portions so that when the stud is rotated in the aperture in a panel the abutment parts engage by means of their side surfaces, and depending on the direction of rotation of the stud, against the sides of the aperture. The aperture in the support will be elongate so as to receive therethrough the cross-head at the end of the shank of the stud and so that on turning of the stud through 90° the cross-head spans the smaller dimension of the aperture in the support to abut the rear of the support on either side of the aperture and thus prevent removal of the stud and hence of the panel from the support.

Preferably, the resilient spacer is formed of a synthetic plastics material, in the form of a wide endless band with apertures in opposite sides of the band through which the stud passes in use. To provide the distance piece spacing apart the panel and the support the spacer may be formed with portions which extend generally parallel to the stud axis, in use between a panel and a support, thereby preventing the spacer from being crushed beyond a predetermined extent, the portions of the spacer between the side portions being domed and providing the required resilience to maintain the cross-head of the stud in engagement with the rear of the support.

The spacer may include apertures which are of non-circular shape so as to enable the spacer to be used in addition to retain the stud in position in an aperture in a panel. This can, of course, also be achieved by making the stud a snap-fit through the spacer.

One example of a fastener according to the present invention will now be described with reference to the accompanying informal drawings in which:

FIG. 1 shows the assembly of the stud and spacer on a panel;

FIG. 2 is a cross-section through the stud and panel on the line II—II in FIG. 3;

FIG. 3 shows the assembly of the fastener on the panel and a support; and

FIG. 4 is an inverted plan view of the stud in the direction of arrow A in FIG. 3.

The stud comprises a head 1 having a slot 2 (see FIG. 3) for engagement by, for example the tip of a screwdriver or the edge of a coin. A shank 3 extends away from the head and at its lower end includes a cross-head 4 which is transverse to the axis of the shank and in alignment with the slot 2 so that the slot 2 provides an indication of the position of the cross-head when it is hidden from view. The head 1 also includes a pair of detents 13 which aid positive engagement of the fastener in the locked and unlocked positions by engaging in shallow recesses 20 which can be formed adjacent the aperture in the panel.

Adjacent the head at the top of the shank 3 there is formed a lozenge-shaped portion 5 (the shape of which can most clearly be seen from FIG. 2) this lozenge-shaped portion being formed by arcuate portions 6 concentric with the axis of the stud, and right-angled abutment parts 7 which, when the stud is rotated in the aperture in the panel 8 engage, by means of the surfaces 9 or 10, depending on the direction of rotation of the stud, against the sides of the aperture in the panel 8.

The cross-head 4 includes surfaces 11 and 12 which, as most clearly shown in FIG. 3, engage the rear surface of a support 14 to which the panel 8 is to be fastened, as the stud is rotated. As the stud is rotated into the position shown in FIG. 2 it is firstly the surfaces 11 which engage the edges 15 of the aperture in the support 14 and then the surface 12 as the stud is drawn into the support by the camming action of the surfaces 11 on the edges 15.

The stud is retained in the aperture in the panel 8, which aperture is elongate to allow for rotation of the lozenge-shaped portion 5 in the aperture, by a spacer 16. The spacer is formed as a wide endless band which is formed partly flattened from a circle so as to provide side portions 17 and domed face portions 18. The spacer is formed of a resilient plastics material and includes apertures in its face portions 18 which are elongate and have a shape which conforms substantially to the shape of the cross-head and shank at the widest part of the cross-head. Thus, by inserting the stud through the spacer and turning the spacer slightly with respect of the stud the stud can be held in the aperture in the panel 8. Retention of the stud in the aperture in the panel is aided by the resilience of the spacer 16 and by the provision of an annular shoulder 19 on the shank 2, over which the spacer is a snap fit, the shoulder slightly compressing the spacer against the panel.

To fasten the panel to the support 14 the cross-head 4 is inserted through the elongate aperture in the support 14 and is then rotated by a quarter-turn. As this is done, the domed face portions 18 of the spacer 16 are compressed towards one another resiliently as the cross-head rides up over the edges of the aperture in the support until it spans the narrow dimension of the aperture, the resiliency of the spacer maintaining the cross-head in engagement with the rear of the support and spacing the panel from the support.

The fastener can be used with panels and supports of different thickness and the spacer has provision for preventing the panel and support whatever their thicknesses from coming closer than a predetermined amount. This is achieved by means of the side portions 17 which, as they lie substantially perpendicular to the panel and support effectively prevent the spacer from being completely flattened.

What I claim is:

1. A quarter-turn fastener for fastening first and second members together comprising a plastics stud and a spacer, said stud having a head and a shank, said shank having at its end remote from said head a cross-head and at the end adjacent said head an abutment adapted to engage the side of an aperture through which said stud is mounted in use on rotation of said stud through a quarter of a turn to prevent further rotation in the same direction, said spacer being resilient and tubular and forming a first pair of opposing sides to engage with adjacent facing surfaces on the first and second members respectively and a second pair of opposing sides substantially perpendicular to the same adjacent facing surfaces, the second pair of opposing sides preventing contact between the two members and the first pair of opposing sides providing the required resilience for maintaining the cross-head of said stud in engagement with one of the two members to retain the two members in fastened interengagement, and said first pair of opposing sides defining apertures through which the shank of the stud passes.

2. The invention in accordance with claim 1 wherein said abutment comprises a portion of said shank adjacent said head of said stud having a lozenge-shaped cross-section, said lozenge-shaped cross-section being defined by arcuate segments concentric with said axis of said stud and right-angled abutment parts extending from the ends of said arcuate portions, so that, when said stud is rotated in said aperture said abutment parts engage against the sides of said aperture.

3. The invention in accordance with claim 1 wherein said spacer is formed of a synthetic plastics material.

4. The invention in accordance with claim 1 wherein the first pair of opposing sides of said spacer are domed to facilitate providing the required resilience for maintaining said cross-head of said stud in engagement with one of the two members to retain the two members in fastened interengagement.

5. The invention in accordance with claim 1 wherein said spacer defines non-circular apertures whereby said spacer may be used in addition to retain said stud in position in said aperture through which said stud is mounted.

* * * * *